(12) United States Patent
Andersen

(10) Patent No.: US 7,445,419 B2
(45) Date of Patent: Nov. 4, 2008

(54) TRAILER/CART FOR LANDSCAPING USE

(76) Inventor: Stephen M. Andersen, 3809 Westbury Dr., Eagan, MN (US) 55123

( * ) Notice: Subject to any disclaimer, the term of this patent is extended or adjusted under 35 U.S.C. 154(b) by 999 days.

(21) Appl. No.: 10/653,122

(22) Filed: Sep. 2, 2003

(65) Prior Publication Data

US 2005/0047897 A1     Mar. 3, 2005

(51) Int. Cl.
*B65G 65/34* (2006.01)
(52) U.S. Cl. ........................................ 414/810
(58) Field of Classification Search .......... 298/24; 414/519, 810
See application file for complete search history.

(56) References Cited

U.S. PATENT DOCUMENTS

| | | | |
|---|---|---|---|
| 1,526,527 A | | 2/1925 | Butler |
| 2,005,552 A | * | 6/1935 | McAfee ..................... 298/24 |
| 3,455,475 A | | 7/1969 | Suteau |
| 3,490,632 A | | 1/1970 | McKinney |
| 3,997,215 A | * | 12/1976 | Parker et al. ................ 298/24 |
| 4,026,441 A | | 5/1977 | Jones |
| 4,294,547 A | * | 10/1981 | Harkleroad .................. 366/1 |
| 4,348,146 A | | 9/1982 | Brock |
| 4,482,281 A | | 11/1984 | Musil |
| 4,646,942 A | * | 3/1987 | Kuhns ..................... 222/144.5 |
| 5,108,038 A | * | 4/1992 | Palladino et al. ............ 239/661 |
| 5,655,872 A | * | 8/1997 | Plotkin ..................... 414/526 |
| 5,785,420 A | * | 7/1998 | Schuff ..................... 366/20 |
| 5,823,734 A | * | 10/1998 | Hagemeyer et al. ......... 414/519 |
| 5,921,200 A | * | 7/1999 | Bondarenko et al. ....... 119/52.1 |
| 5,934,731 A | * | 8/1999 | Routledge ................ 296/51 |
| 5,997,099 A | * | 12/1999 | Collins .................... 298/29 |
| 6,106,211 A | | 8/2000 | Westwood |
| 6,474,926 B2 | * | 11/2002 | Weiss ...................... 414/332 |
| 2001/0055524 A1 | | 12/2001 | Jackson et al. |
| 2004/0016378 A1 | * | 1/2004 | Powell et al. .............. 111/200 |

FOREIGN PATENT DOCUMENTS

EP          0 330 000          8/1989

* cited by examiner

*Primary Examiner*—Charles A Fox
(74) *Attorney, Agent, or Firm*—James J. Paige; Nikolai & Mersereau, P.A.

(57) ABSTRACT

A portable cart/trailer containing a bin by which a landscaping supply company can deliver landscaping materials. The cart/trailer and bin being left at the job site until it is emptied and returned to the provider of the landscaping materials. The trailer includes a bin elevated off the ground so that a wheelbarrow can simply be placed under the hopper. A gate door is opened and material is able to directly flow into the wheelbarrow, thus saving the labor required to shovel the material from the ground into the wheelbarrow.

5 Claims, 10 Drawing Sheets

TRAILER/CART FOR LANDSCAPING USE

BACKGROUND OF THE INVENTION

I. Field of the Invention

This invention relates generally to trailers/carts, and more particularly to a labor saving trailer that can be used by people involved in residential or commercial landscaping endeavors to eliminate the need to shovel landscaping material off the ground into a wheelbarrow.

II. Discussion of the Prior Art

Landscaping material suppliers typically deliver raw materials, such as dirt, rock, mulch, or the like in dump trucks and simply dump the material on a pile on a person's driveway or yard. A person then has to shovel the material up and into a wheelbarrow to transport the material to a location in the yard where the material will be deployed. Because of the strenuous work involved in performing such a task, there is a demand for some type of device that would aid in the transportation, storage, and distribution of this type of landscaping material.

Bins for storing various materials are well-known in the art. Many of these bins are elevated or placed in overhead positions from which materials can be dispensed. Some existing bins of this nature are even portable.

Prior art patents which disclose portable bin assemblies include U.S. Pat. No. 3,490,632 to R. E. McKinney, a pending patent application to Jackson et al., European Pat. No. 0 330 000, and U.S. Pat. No. 4,294,547.

SUMMARY OF THE INVENTION

The present invention provides for a portable cart/trailer to be used for loading, hauling, storing and dispensing landscaping material. The invention comprises a trailer mounted, open-topped bin with four converging sidewalls into which landscaping material is loaded. One of the sidewalls of the bin has a passageway near its base through which the loaded landscaping material can flow. A gate is provided that can be positioned either to obstruct this passageway or open the passageway to permit material to flow from the bin and into a wheelbarrow for transport. The gate is opened and closed through the use of a lever which operates to govern the vertical movement of the gate.

This arrangement allows landscaping materials to be loaded into the bin and then transported to a job site. The trailer is parked and the material is dispensed in small increments into a wheelbarrow through the opening in one of the bin's sidewalls. The gate is used to control the flow of material from the bin into the wheelbarrow. The wheelbarrow is then used to move material from the bin to the desired location at the job site.

The present invention is advantageous over the prior art due to new concepts included in its simplified, easy to use, and uniquely shaped design. Some differences include the construction of the cart, the hopper, and the gate. Additionally, this design is advantageous and unique because it specifically relates to a new method for delivery of landscaping materials.

This design prevents the need for the end-user to shovel raw material from the ground into a wheelbarrow. The present invention reduces clean up efforts, as the raw material does not sit directly on the ground, which would typically be swept or raked. Finally, the present invention reduces waste, as any remaining raw material may be removed by the cart/trailer for use in another project.

These and other objects, features, and advantages of the present invention will become readily apparent to those skilled in the art through a review of the following detailed description in conjunction with the claims and accompanying drawings in which like numerals in several views refer to the same corresponding parts.

DESCRIPTION OF THE PREFERRED EMBODIMENT

The present invention represents a broadly applicable improved trailer/cart suitable for storing, transporting, and distributing landscaping materials. The embodiments herein are intended to be taken as representative of those in which the invention may be incorporated and are not intended to be limiting.

Figure 1:
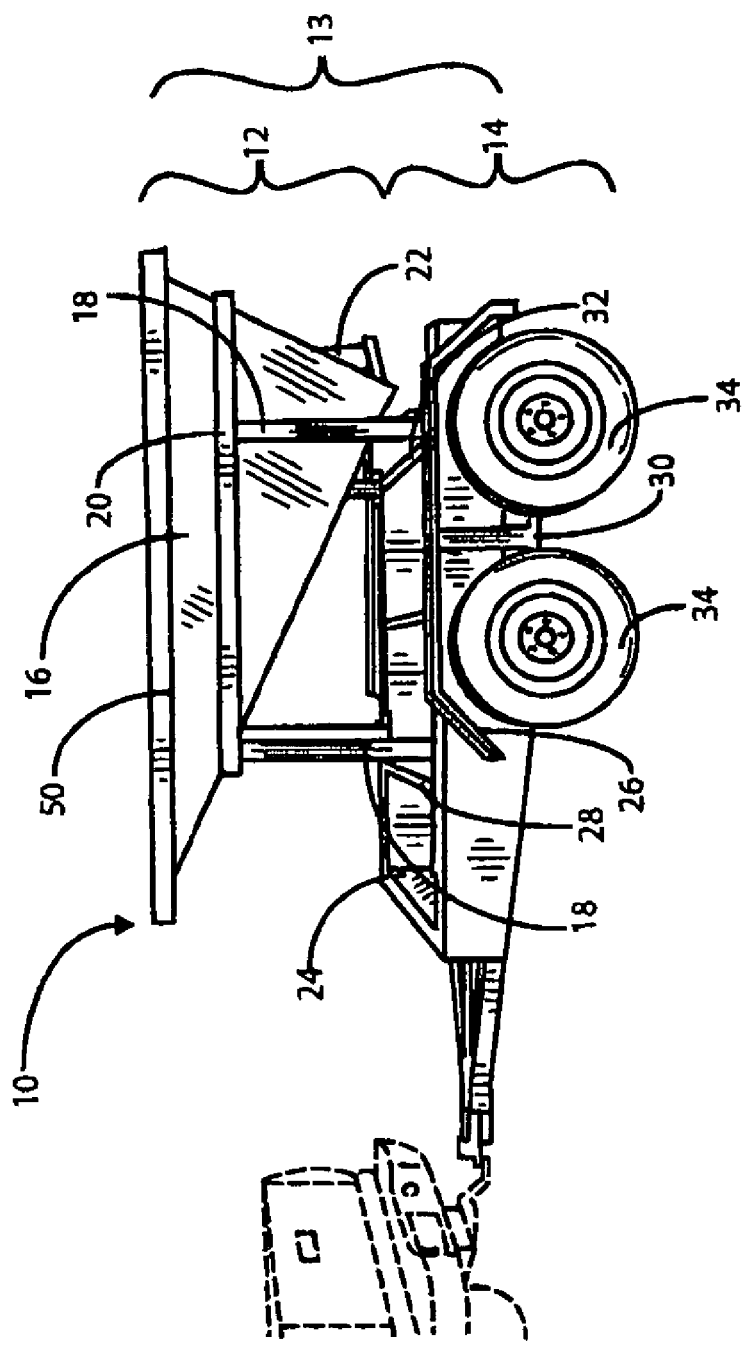
FIG. 1 is an perspective view of the right side of the present invention.

Referring first to FIG. 1, there is shown an perspective view of the cart/trailer design. The assembly itself is indicated generally by numeral 10 and includes a hopper assembly 12, a hopper support assembly 13, and a trailer assembly 14. The hopper assembly 12 generally comprising bin 16, the hopper support assembly 13 largely comprising vertical support bars 18 and horizontal support bars 20, and the trailer assembly 14 largely comprising trailer frame 24, wheel covers 26, lateral supports 28, 30, 32, and wheels 34.

Figure 2:
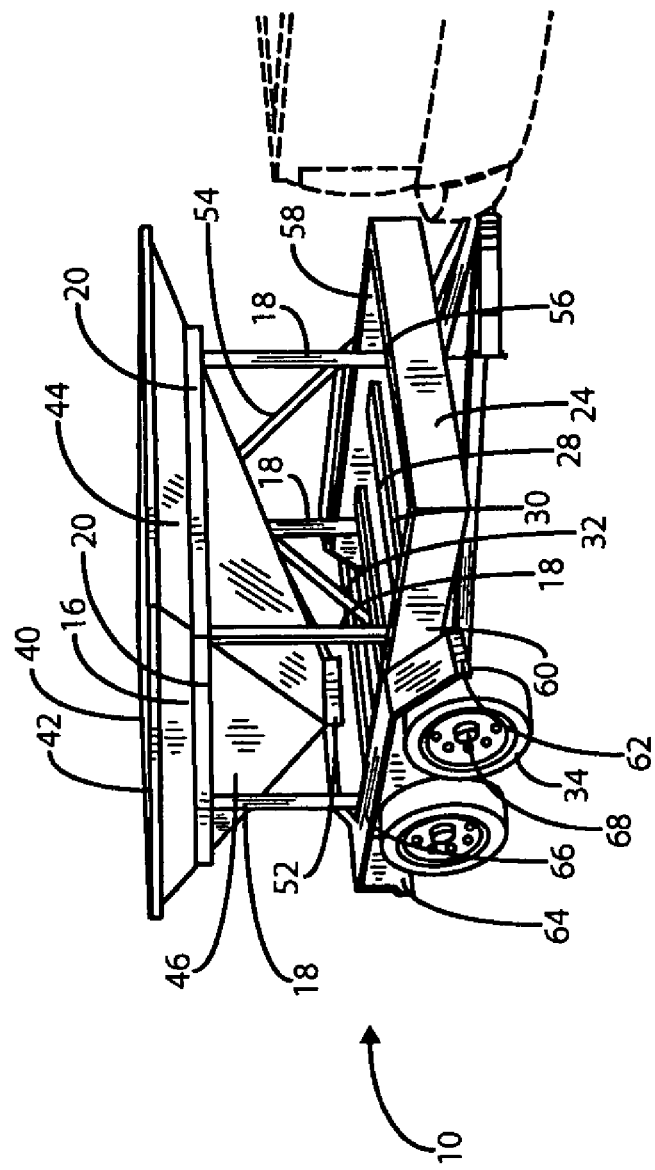
FIG. 2 is an perspective view of the left side of the present invention.

As shown in FIG. 2, the hopper assembly 12 comprises a bin 16. Bin 16 has an open top 40 bordered by a rim 42 and four converging metal sidewalls: front sidewall 44, left sidewall 46, rear sidewall 48 (see FIG. 4), and right sidewall 50 (see FIG. 1). Front sidewall 44 and rear sidewall 48 both have a width of approximately 8-9 feet on the top on its respective side and converge to a common shorter width at the bottom 52. The width of bottom 52 is slightly smaller than the width of a typical wheelbarrow. With respect to the horizontal plane, front sidewall 44 is much more steeply sloped than that of rear sidewall 48. (See FIG. 1) Front sidewall 44 is also much longer than rear sidewall 48 due to this design. The interior angle between the front and rear sidewalls 44 and 48 is approximately 90 degrees, although it is important to note that the rear sidewall 48, while steeply sloped, is not vertical. The angle of the rear sidewall 48 is preferably between 30° and 80° with respect to the horizontal. Most preferably, this angle is at least 45°. The left and right sidewalls 46 and 50 are generally triangular in shape. The side of this triangular shape closest to the rim 42 is the longest. The other two sides of each of the triangular shaped sidewalls converging to a point which comprises the corners of bottom 52, approximately a 90° angle between the two sides. One of the sides is congruent with the edge of the front sidewall 44. The other side is congruent with an edge of the rear sidewall 48. As such, the four sidewalls cooperate to form an open top enclosure. When material is loaded into the bin 16 and the trailer is placed on a relatively level surface, gravity will force the material toward the bottom 52.

The bin 16 is supported by the hopper support assembly 13. The hopper support assembly has four horizontal housing support bars 20 surrounding housing bin 16 on all four sides of its perimeter a short distance beneath the bin's rim 42. These metal support bars 20 are fixedly attached to the sidewalls of the housing 16 and are supported by four vertical support bars 18 which are bolted to the frame 24 of the trailer assembly 14. Additionally, there are two diagonal support members 54 that extend from the center of the horizontal support bar 20 on the front sidewall 44 to one of the two vertical support bars 18 closest to the front of the trailer. These diagonal support members 54 are flat metal bars with holes for attachment on their ends.

Also shown in FIG. 2 is the trailer assembly 14. The trailer assembly 14 has a frame 24 of a generally rectangular shape with a front member 56, right side member 58, a left side member 60 and three additional lateral supports 28, 30, and 32 fixedly attached to the right and left side members 58 and 60 and in parallel, spaced apart relation to the front panel 56. The lateral supports 28, 30, and 32 reinforce the structural integrity of the trailer's design. It is also important to note that the lateral support 32 is located forward of the bottom of housing bin 16, so as to allow a wheelbarrow, etc. to be wheeled in from the rear and placed underneath the bottom 52 of the bin 16.

The frame 24 is mounted on a pair of axles 68 which support the frame 24. The axles 68 extend laterally across the width of the trailer frame 24, parallel to the lateral supports 28, 30, and 32. A wheel 34 having a tire mounted therein is located at each end of each axle. The axles are spaced and positioned so they can support the trailer in a steady fashion even when the trailer is not hitched to a vehicle. The axles are also positioned with respect to each other so that the trailer can be turned without the wheels being steerable.

Wheel covers 26 also are attached to approximately the back half of the side members 58 and 60. These wheel covers 26 have an angled front panel 62, back panel 64, and a horizontal top panel 66, which cooperate to surround the top half of the wheels 34. The wheel covers 26 are slightly raised above the height of the side panels 58 and 60, and the widths of the wheel covers 26 are wider than widths of the wheels 34.

Figure 3:
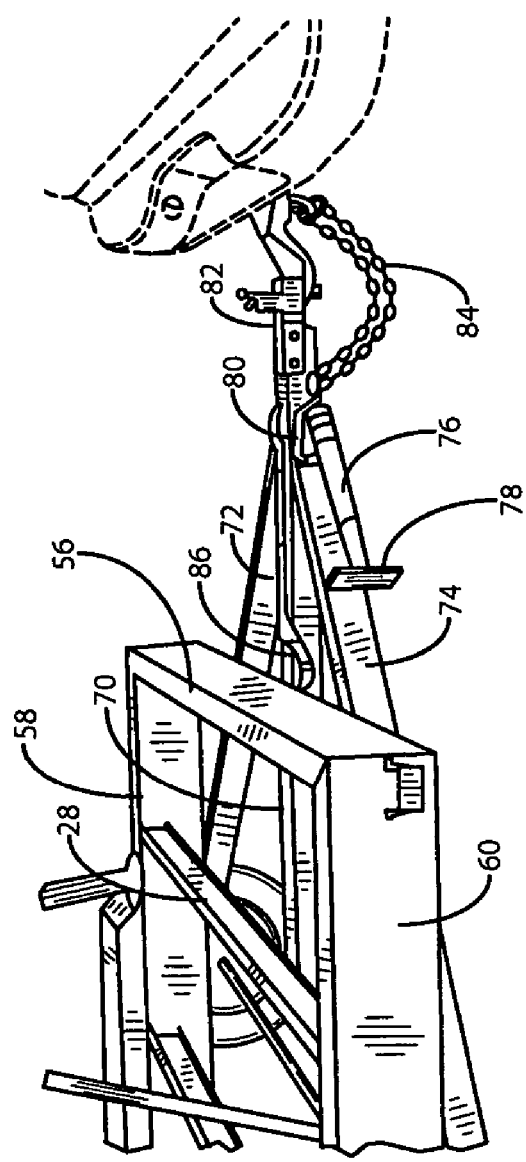
FIG. 3 is a perspective view of trailer hitch of the present invention.

FIG. 3 shows the tongue and hitch assembly 62 of the trailer. The tongue comprises a central post 70 which runs longitudinally down the center of the trailer starting from beneath the center of the foremost lateral support 28 and continues approximately 3-4 feet beyond the front member 56. The tongue also has two diagonal supports 72 and 74 which extend outwardly and rearwardly from the central post 70. Support 72 extends between central post 70 and side member 58. Support 74 extends between the central post 70 and the side member 60. The diagonal supports 72 and 74 converge to a point near the end of central post 70 where they are welded to the post. A standard hitch receiver 82 is attached to the front of the central post 70. The hitch receiver allows the trailer to be coupled to any ball type hitch on a vehicle for towing of the trailer.

This hitch element 82 is designed for easy attachment to a ball hitch of a truck. Also attached to the central post 70 are two safety chains 84 which hook to the vehicle as a safety precaution. An electrical connector and wiring 86 can also be seen along the central post 70 and around the frame of the trailer. This electrical wiring 86 is used to power and control the trailer brakes, found in the well of each of the wheels 34, as well as the brake lights 88 (not shown).

Latched to the central post 70 is a stand 76. Stand 76 is an extendable metal pipe which has a foot member 78 on its end for resting on the ground. The stand may be placed in the up position as shown in FIG. 3 when the trailer is being moved, or rotated into the down position if the trailer is to be unhitched from the truck and left at a jobsite. This stand 76 also includes a manual crank 80 which can extend or retract the stand 76 as necessary. The stand helps support the trailer when it is not hitched to a vehicle. At the end of central post 70, a ball hitch attachment 82 is bolted to the post 70.

Figure 4:
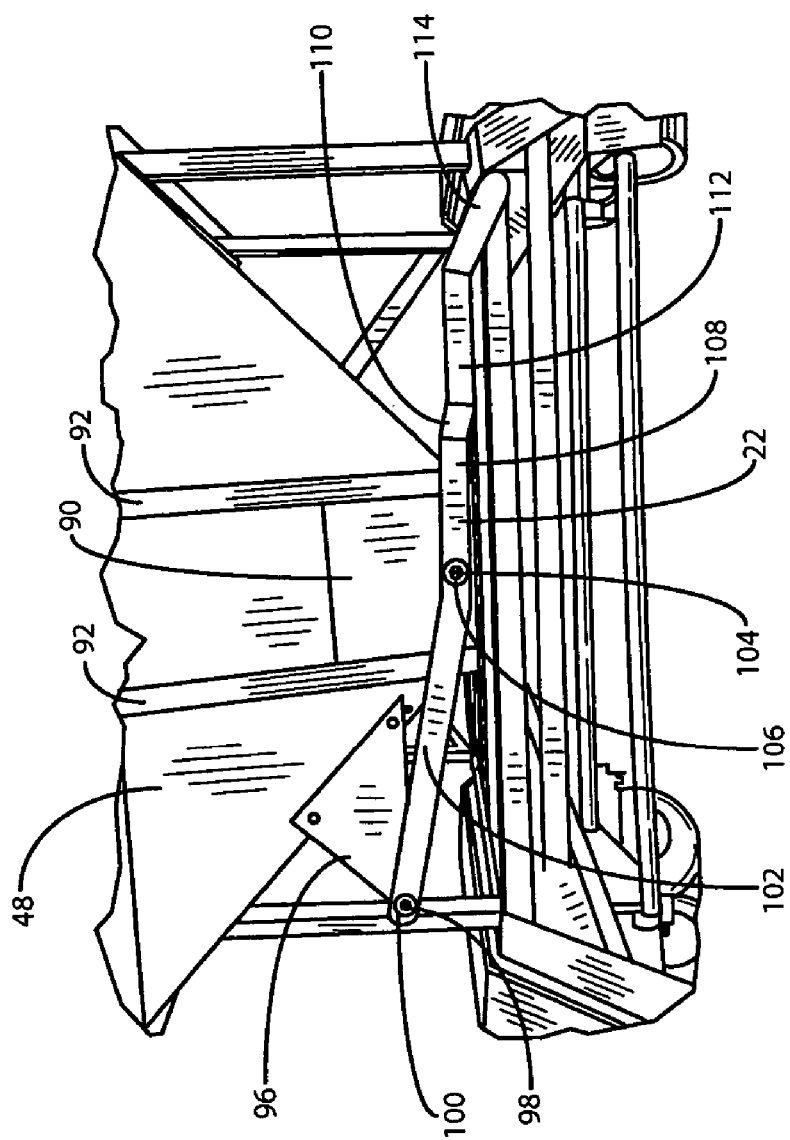
FIG. 4 is a perspective rear view of the present invention with the gate closed.

A key feature of the present invention is the gate 90. The rear sidewall 48 has an opening 94 extending up from the bottom 52. Gate 90 controls the flow of material from the bin 16 out of this opening. Referring now to FIG. 4, the back side of cart/trailer assembly 10 is shown with the gate 90 in the closed position. The gate 90 is generally a flat panel of metal which is capable of sliding up and down the rear sidewall 48 between a pair of rails 92. When the gate 90 is in its lowest position, as shown in FIG. 4, the gate 90 covers the square opening or passageway 94 (not shown), cut through rear sidewall 48. Protruding from the left side of the FIG. 4 is a triangular panel extension 96 which is bolted to the side of the rear panel 48. This triangular panel 96 is fixedly attached in two of its corners. The remaining corner, which protrudes from the housing bin 16, has a bolt 98 mounted through a hole 100 within the triangular panel 96. This bolt 98 serves as the pivot point for gate lever 22 used to open and close the gate.

Gate lever 22 is a flat, rigid, metal bar which contains several bends to control the motion of the gate 90. The gate lever 22 generally has a straight section 102 which angles from pin 98 to another pin 104 set within a slotted hole 106. The pins 98 and 104 typically are bolts. The gate lever 22 next has a short horizontal section 108 followed by a section 110 which protrudes diagonally outward from the assembly. Next there is another horizontal section 112 and finally there is a section that slants horizontally downward and serves as a handle 114 for the operator. The gate lever 22 may be raised by a operator in a largely horizontal fashion to open the gate 90. Because the lever 22 is pivoted around bolt 98, the slotted hole 106 is somewhat oval shaped to accommodate some lateral movement of bolt 104. The edges of the hole 106 serve as stops. For example, when the gate lever 22 is in the lowered position, the bolt rests against the right side of slotted hole 106. When the lever is raised up, the bolt 104 slides until it reaches the left side of the slotted hole 106. At this point, the gate can be raised no further. The assembly shown results in smooth movement of the gate 90 between the lowered to raised positions. (See FIG. 6)

Now that the details of the mechanical construction of the cart/trailer assembly of the present invention have been described, its mode of operation will be described.

Figure 5:
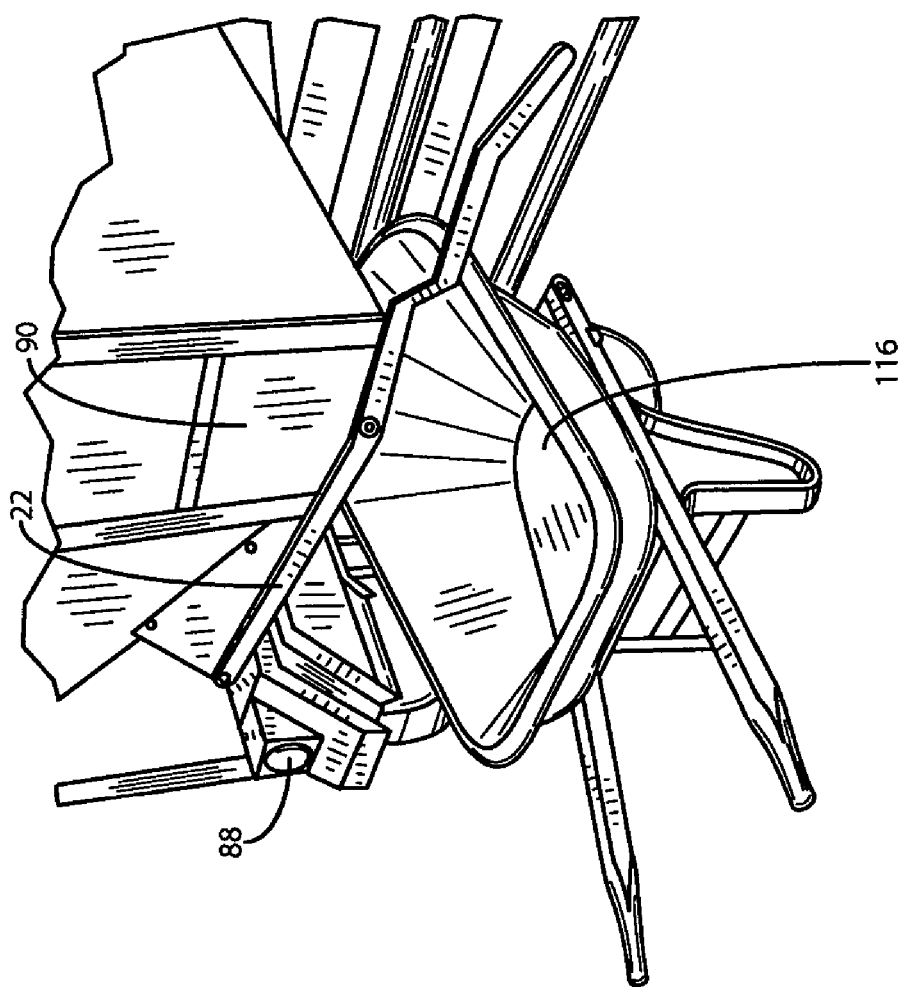
FIG. 5 is a perspective rear view of the present invention with a wheelbarrow ready for loading.

Operation of the present invention begins when a landscaping material vendor loads landscaping material into the bin 16 through the open top. The cart/trailer assembly 10 is then transported to the desired worksite using a truck, car, or the like equipped with a trailer hitch to tow the trailer assembly 10. Here the assembly 10 is unhitched, the stand 76 is deployed, and the assembly 10 is left on a driveway or other flat surface. Next, a wheelbarrow 116 is placed underneath the back end of the housing bin 16, as seen in FIG. 5.

Figure 6:
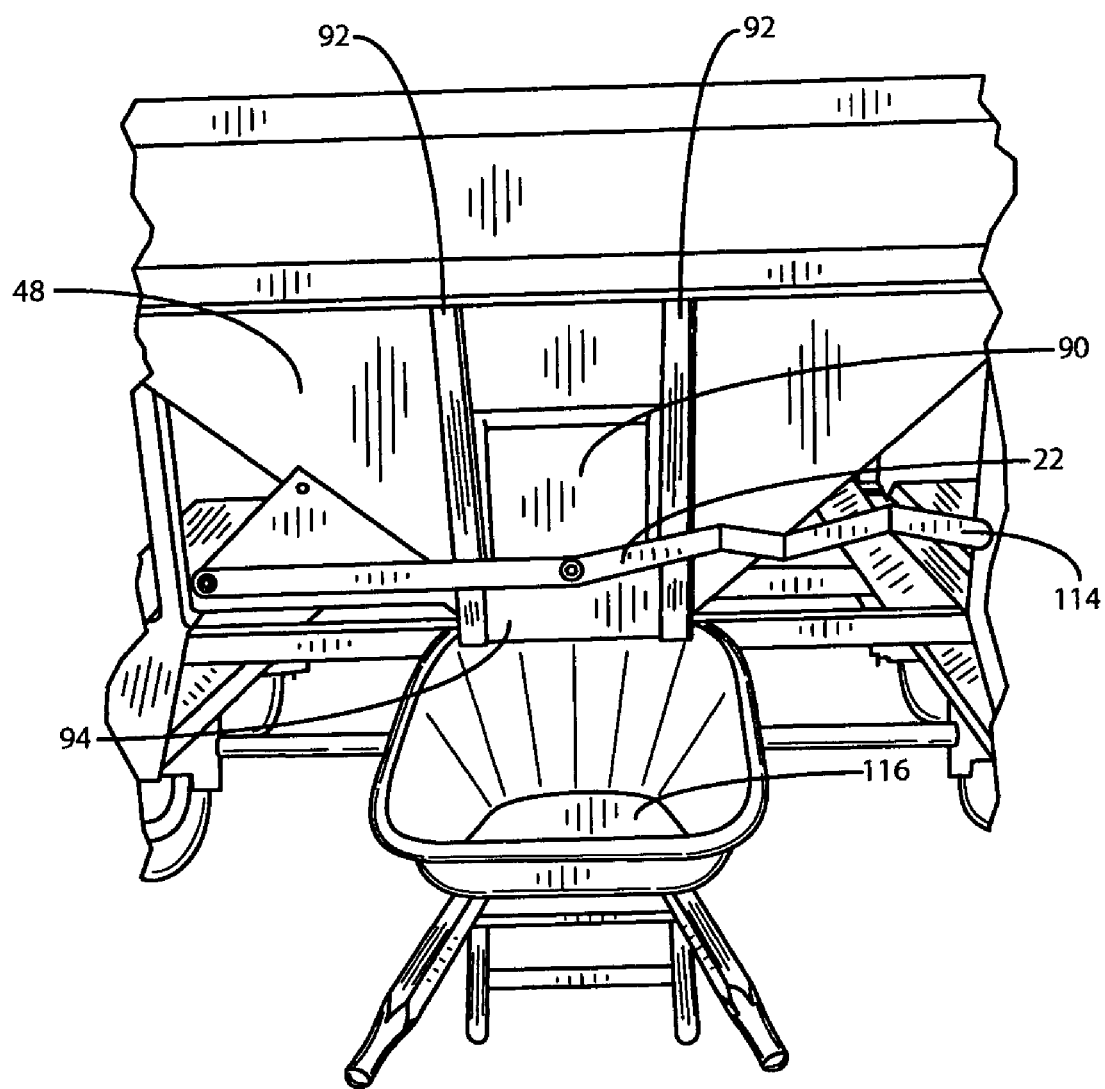
FIG. 6 is a perspective rear view of the present invention with the gate open demonstrating the filling of a wheelbarrow.

FIG. 6 shows the next step, where the operator lifts the handle 114 of gate lever 22. This causes the gate 90 to move upward along rails 92 and for landscaping material to flow from the bin through the passageway 94 in the rear sidewall 48. When the wheelbarrow 116 is full, the gate lever 22 is lowered and the flow of landscaping material is stopped. The user may then deliver the material loaded into the wheelbarrow to the desired location before returning to the trailer for another load. This method of unloading and delivering material is repeated until the hopper is empty or the job is complete. Upon completion, the trailer may be picked up by a worker and used for another job.

ALTERNATIVE EMBODIMENTS

Figure 7:
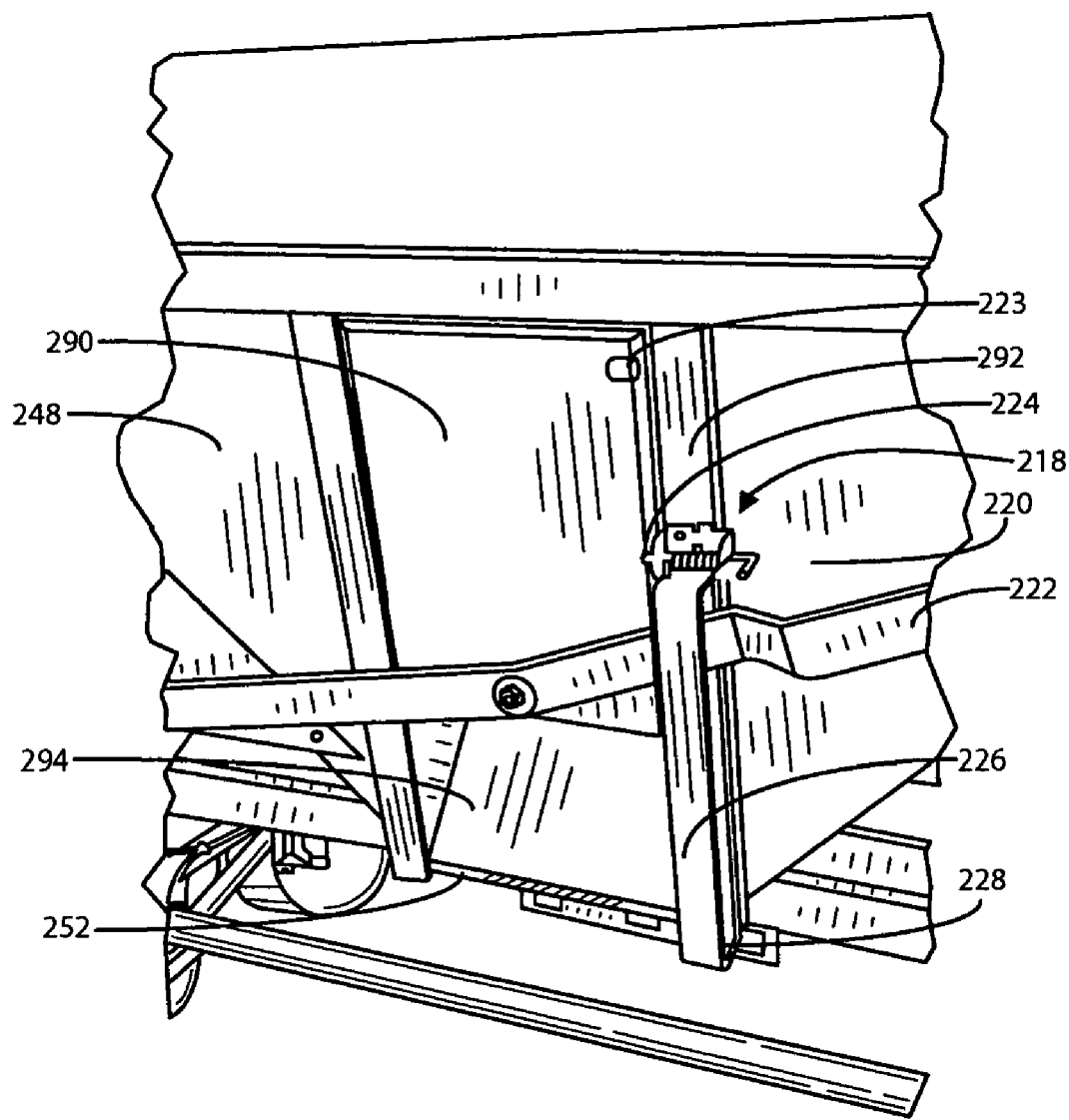
FIG. 7 is a perspective rear view of an alternative embodiment of the present invention with the gate open.
Figure 8:
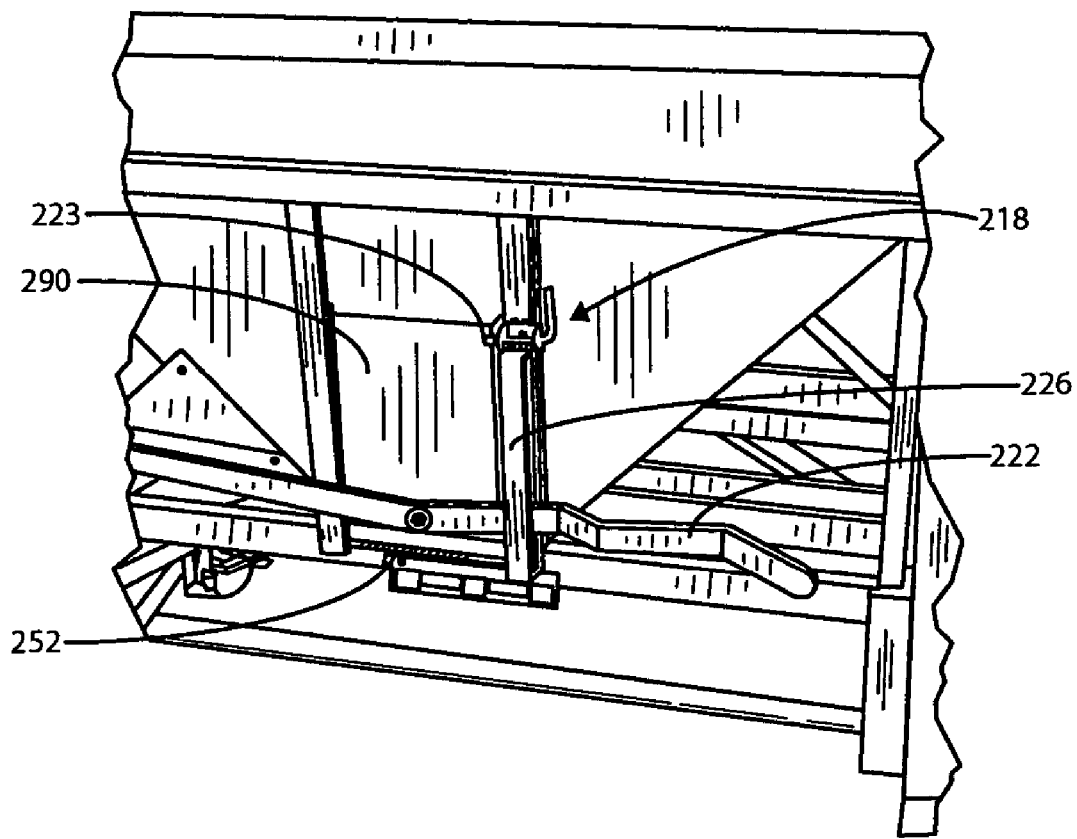
FIG. 8 is a perspective rear view of an alternative embodiment of the present invention with the gate partially closed and in the safety position.

FIGS. 7 and 8 disclose an alternative embodiment of the present invention to further aid in the distribution of landscaping material by providing the option of placing gate 290 in a locked open position.

FIG. 7 shows a rear end view of a cart/trailer assembly similar to the one earlier described, but additionally containing an apparatus for gate control including a spring loaded pin 218. The spring loaded locking pin 218 is L-shaped, mounted on rail 292 and contains a handle 220. The spring loaded locking pin is designed so one can partially insert its longitudinal length across rail 292 into either an upper receiver slot 223 or a lower receiver slot 224 on the gate 290.

Additionally, this embodiment contains a U-shaped bar 226 which is mounted on the rear sidewall 248 of the assembly from bottom 252 to a location about two-thirds the length up rail 292. The gate lever 222 extends through the passageway formed between the U-shaped bar 226 and rail 292. The lowermost end 228 of the U-shaped bar 226 serves to stop the gate lever 222 in a position which corresponds to the closed position of gate 290.

The operation of the alternative embodiment is now described. The hopper is first loaded with landscaping material, delivered to the job site, and deployed in the manner previously disclosed. The operator places a wheelbarrow underneath the opening 294 and prepares to unload the material from the bin. During the discharge operation the operator must use both hands to control the flow of material. One hand must pull the rod 220 of spring loaded pin 218 away from the gate 290 while the other hand must lift the gate lever 222 to raise the gate 290. The gate 290 will slide upward within rails 292. If the operator so desires, he may release the rod 220 of spring loaded pin 218 when it aligns with lower slot 224. This procedure will lock the gate 290 and gate lever 222 in their highest position and allow material to freely flow from inside the bin 216 without any further effort of the operator. When the operator desires, he again may pull the spring loaded pin 218 away from the gate 290 with one hand and slowly lower the gate lever 222 with the other hand. In the case that the operator inadvertently drops the gate lever 222 too quickly, there is a safety precaution in the form of an upper slot 223 into which the rod 220 of spring loaded pin 218 inserts to stop the gate 290 from free falling down onto a user or his limbs.

The safety precaution of the upper slot 223 is illustrated in FIG. 8. When the rod 220 is inserted into upper slot 223 it leaves a gap of a few inches between the lower edge of gate 90 and bottom 52. The gate lever 222 is lowered against U-shaped bar 226 to fully close the gate 290 when the desired amount of material is dispensed. The U-shaped bar is responsible for stopping the gate 290 rather than the slotted hole 106 disclosed in the preferred embodiment. The procedure of opening the gate 290 is repeated until the desired amount of landscaping material is dispensed.

SECOND ALTERNATIVE EMBODIMENT

Figure 9:
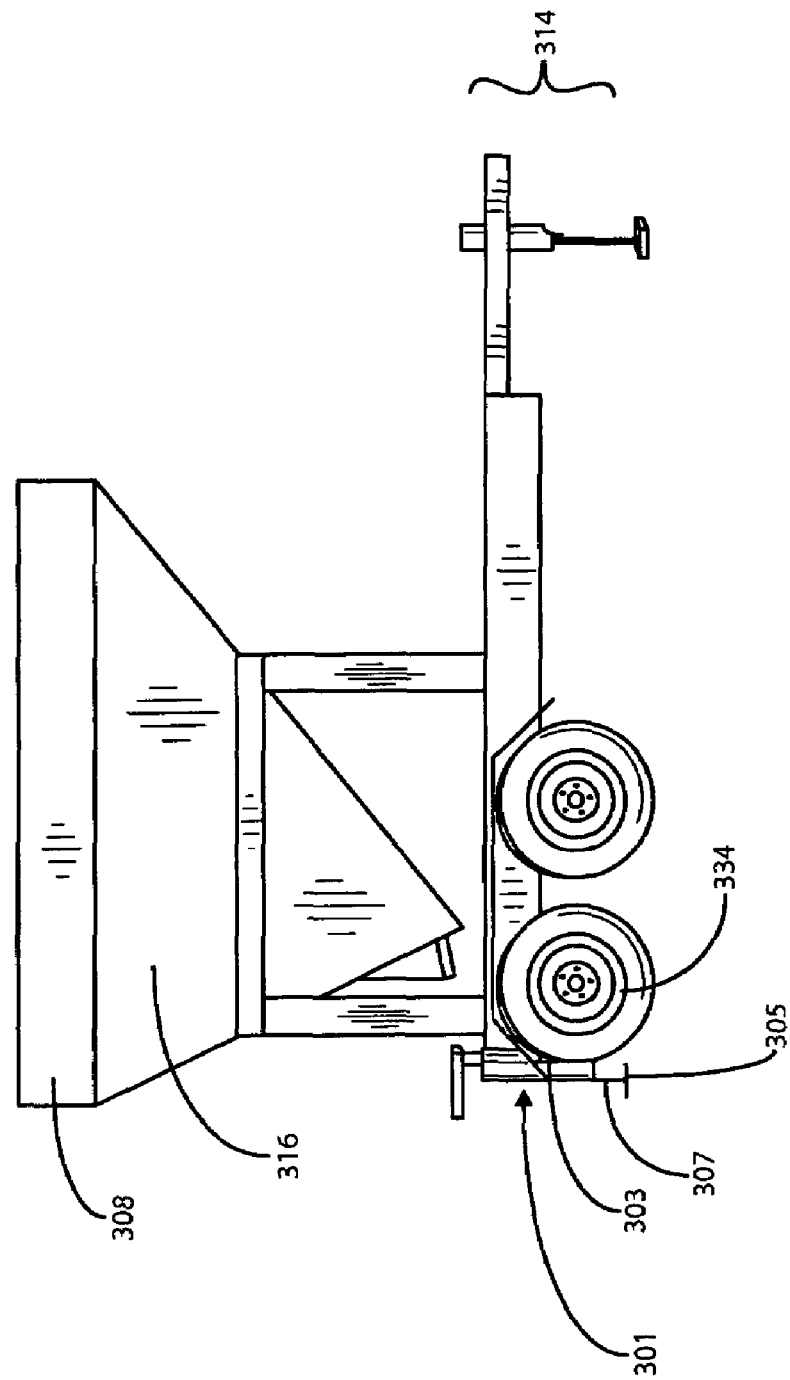
FIG. 9 is a side view of an alternative embodiment of the present invention.
Figure 10:
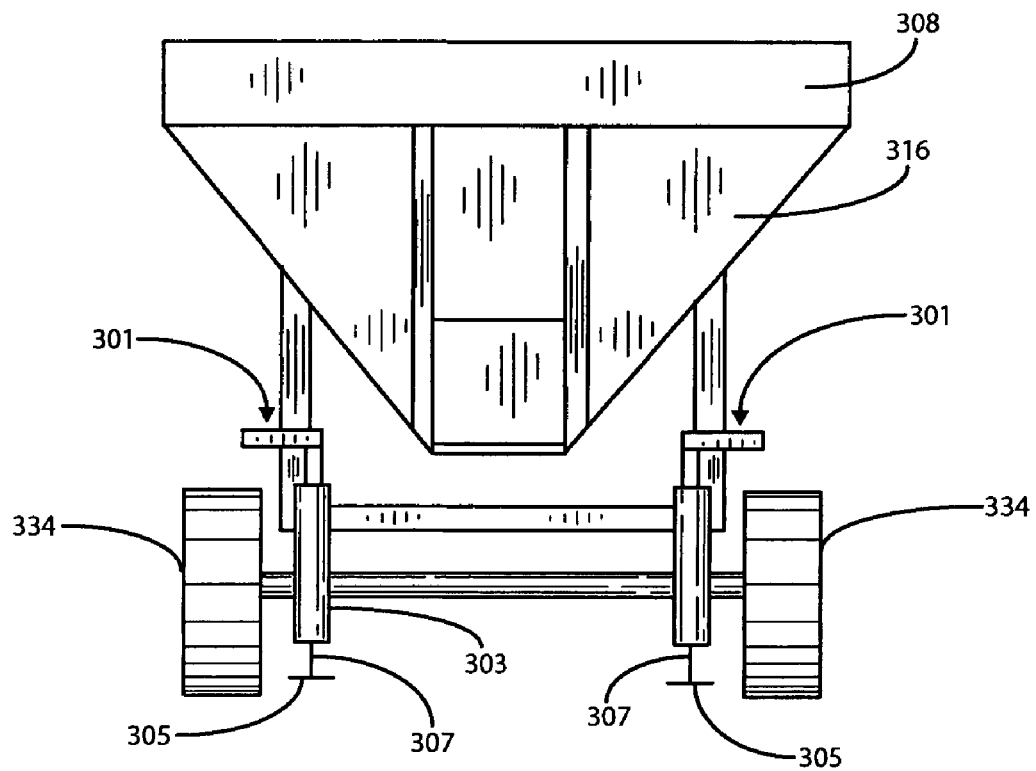
FIG. 10 is a rear view of an alternative embodiment of the present invention.

FIGS. 9 and 10 disclose an alternative embodiment of the present invention to further aid in the distribution of landscaping material by providing additional means for stabilizing the assembly and a simplified bin design for manufacture.

FIG. 9 shows a side view of a cart/trailer assembly similar to the one earlier described, but additionally containing two outriggers 301. The outriggers are each made up of both a body portion 303, a foot piece 305 and a shaft 307. The foot piece 305 is capable of vertical displacement relative to the body portion 303. Thus, shaft 307 and foot piece 305 are coupled to the shaft 307. The shaft 307 is in slidable engagement with body portion 303. These outriggers 301 have their body portion 303 fixedly attached to the rear of trailer assembly 314, one located inside each of the rearmost wheels 334. The feet 305 are normally in a raised position during transport. Once the invention is transported to a jobsite and is read) for distribution of landscaping material, the feet 305 of the outriggers 301 are lowered to engage the ground. These feet 305 provide further stability and support for the assembly by reducing any movement that might take place. A suitable locking mechanism can be used to secure the feet 305 in either the raised or lowered position.

Another modification to previously disclosed embodiments includes additional metal panels 308 surrounding the bin 316 that extend vertically upward from the top of the bin's sloping sidewalls. These metal panels 308 eliminate the need for the metal rim 42 of previous embodiments and provides a simplified design for manufacture.

FIG. 10 shows a rear view of the cart/trailer assembly. This figure shows both the location of the outriggers 301 and the vertical metal panels 308 surrounding the upward opening of the bin 316.

It can be seen, then, that the present invention provides an improved, versatile, and efficient trailer assembly. The result is a device which is easy to operate and a real labor savor when performing doing landscaping jobs.

This invention has been defined herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for delivering sizeable quantities of landscaping material from a distribution site to remotely located job sites using a trailer having a bin for storing and transporting such landscaping material such bin having a discharge opening and a gate for controlling the passage of landscaping material from the bin through the opening, the method comprising the steps of:
    (a) with the gate in a closed position, loading the bin of the trailer with landscaping material at a distribution site;
    (b) transporting the trailer to a job site remotely located from the distribution site using a vehicle to pull the trailer;
    (c) positioning the trailer at the job site so that it is generally level;
    (d) placing a wheelbarrow underneath the discharge opening in the bin of the trailer;
    (e) moving the gate to an open position using a lever to pivotally coupled to the bin and coupled to the gate through the use of a pin and hole to permit the passage of a desired quantity of landscaping material out of the opening and directly into the wheelbarrow, said lever extending a sufficient length so that one need not reach over said wheelbarrow positioned underneath said opening to actuate said lever;

(f) moving the gate back to said closed position using said lever to obstruct the passage of material out of the bin;

(g) using the wheelbarrow to distribute the landscaping material at the desired location at the job site;

(h) repeating steps (d)-(g) until all the landscaping material needed for the job is distributed or the bin is empty; and (i) transporting the trailer back to the distribution site.

2. The method of claim 1 in which said lever is pivotally mounted to the bin by a triangular panel.

3. The method of claim 1 in which the bin is constructed so that it remains at a height such that a wheelbarrow can be positioned underneath the discharge opening.

4. The method of claim 1 in which the gate member may be held in the open position through use of a releasable locking pin which cooperates with a receiver slot.

5. The method of claim 2 in which the gate is moved into the closed position by lowering the rigid lever until it comes into contact with the bottom inside of a metal bracket in which the rigid lever resides.

* * * * *